Patented Aug. 13, 1935

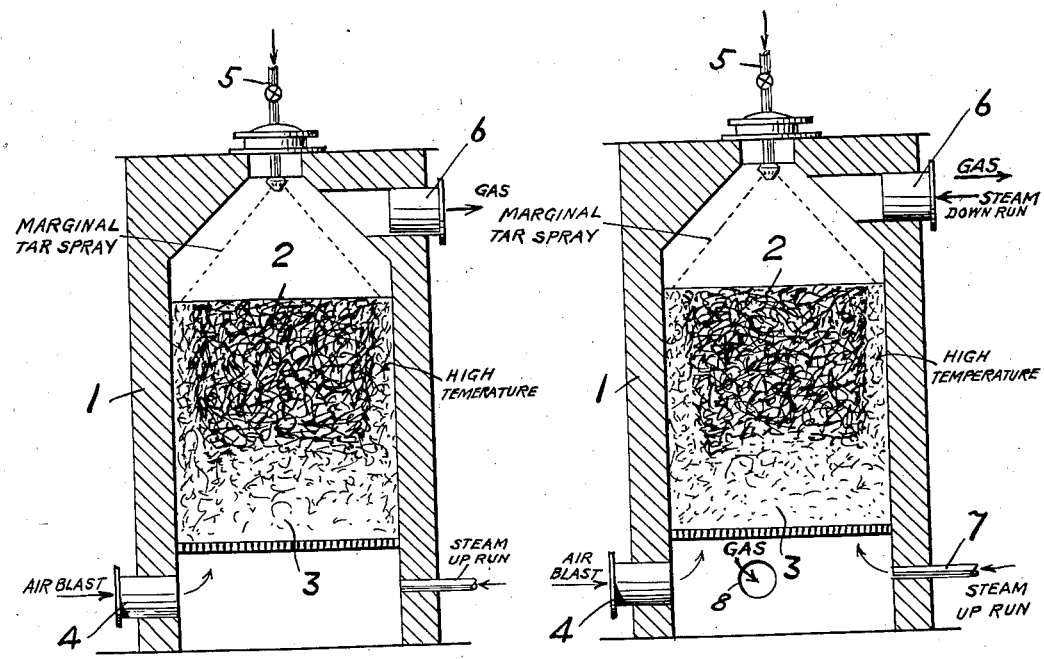

2,011,277

UNITED STATES PATENT OFFICE 2,011,277

MANUFACTURE OF ENRICHED WATER GAS

Arthur Robert Griggs, Westminster, London, England

Application May 4, 1932, Serial No. 609,286

3 Claims. (Cl. 48—208)

This invention relates to the manufacture of gas and its object is to enable considerable quantities of gas tar or tar products as well as heavy hydrocarbon oils or residuums, to be used for that purpose in standard water gas sets.

In ordinary gas works practice, tar is a by-product which is often difficult to dispose of or it is unsalable except at a very low price and furthermore the price realizable is subject to fluctuation and beyond the control of the gas works. At times, the only way to dispose of the tar has been to burn it under steam boilers and, notwithstanding the fact that it contains volatile or vaporizable constituents and carbon which theoretically should be utilizable in the process of making enriched water gas, it has hitherto been found impracticable to so utilize the tar on a standard water gas generator and, even when specially designed plant has been proposed, no general adoption of the idea has followed.

Times have occurred when gas works have been actually disposing of their tar at no profit whatever while at the same time they have had to buy large quantities of gas oil for the enrichment of water gas at a high cost.

The present invention, which can be very economically carried out in standard water gas plant, will enable such situations to be met with considerable financial advantage.

In the drawing:

Fig. 1 is a diagrammatic view, in vertical cross-section, through a gas-manufacturing apparatus.

Fig. 2 is a diagrammatic view, in vertical cross-section, through a modified form of gas-manufacturing apparatus.

In that embodiment of my invention chosen for illustration in the drawing and description in the specification, there is shown a water gas generator 1 containing a bed of solid fuel. The fuel bed has a portion 2 of relatively low temperature, and a marginal portion 3 especially in the upper part of the fuel bed which is of relatively high temperature due to air blasting. Generator 1 is provided with an inlet 4 for air blast, with an inlet 5 leading to a spray by means of which tar may be sprayed on the hot marginal portions of the fuel bed, and a gas offtake 6 for the resulting gases which are led off for further processing or for storage or eventual distribution and use. Generator 1 also has an inlet 7 for steam for making an uprun through the fuel bed.

In Fig. 2 of the drawing, there is shown a modification of my invention, consisting of a generator 1 containing a bed of solid fuel, of which portion 2 is of relatively low temperature and portion 3 is of relatively high temperature due to the passage of air blast gases through the fuel bed and, in larger part, through portion 3 of the fuel bed. Generator 1 has an inlet 4 for air for upwardly blasting the fuel bed, an inlet 5 leading to a spray for spraying tar on the hot marginal portion of the fuel bed, an outlet 6 for the manufactured gas, an inlet 7 for steam for making an uprun through the fuel bed, and an outlet 8 for gas resulting from the down run with steam.

According to the invention, after the fuel bed of a water gas generator has been heated by upwardly blasting with air so that, owing to the lower resistance offered to the blast by the fuel lying against the generator side walls, the marginal portion of the fuel bed, especially in the upper fuel layer, will be caused to attain a higher temperature than the fuel in the central part of the generator, tar is sprayed on to the hot marginal portion of the fuel bed only and, during a down run therethrough, vapors and gases distilled from the tar are cracked within the fuel bed in the presence of water gas and excess steam with the result that a comparatively large proportion of methane is present in the produced gas. For the down run, steam direct from the boiler or steam superheated outside the set may be used and in apparatus provided with a fixing vessel or vessels, such as a carburetter and superheater heated by combustion of the blast gases taken off from the generator, the down run may be a back run with steam superheated in the fixing vessels.

The temperature of the top marginal portion of the fuel bed thus blasted upwardly in the usual way without burning blast gases with secondary air in the generator top, will be sufficiently high to vaporize the tar and usually will not be excessive for the purpose.

In order to ensure the proper partial decomposition of the tar and retain its hydrogen in combination with its carbon without overcracking and liberation of all or most of the carbon, the temperature of the fuel bed may be controlled by making an uprun through the fuel bed immediately after blasting it and before making the down run. In cases where fixing vessels are provided and the tar being used contains a considerable quantity of the more easily volatile constituents, the tar, or some of it, may be sprayed onto the marginal portion of the fuel bed during the preliminary uprun and the more volatile constituents driven off with the hot water gas into the fixing vessel or vessels where the temperature is sufficiently high to fix such constituents as permanent gases. It is preferred to inject the tar during the latter part of the preliminary uprun at a high rate so that the tar is not in contact with the fuel bed during the uprun longer than is approximately required to flash off or volatilize the lighter constituents thus avoiding distillation of the heavier constituents and their passage to the fixing vessels where the temperature would be insufficient to fix them. During the succeeding down run, which may be a back run with superheated steam as stated, the less volatile components constituting the major part of the tar pass down through the fuel bed and are cracked therein, excess carbon liberated being retained in the fuel bed and subsequently converted into gas during the process. The down run may be followed by an uprun to purge out remaining tar vapors which are passed through the usual carburetter and superheater. During upruns the produced gas may be carburetted with oil in the fixing vessels.

In order that the fuel bed shall be maintained in an efficient condition for the production of water gas and that the deposited carbon resulting from the cracking of the tar shall not accumulate but shall be consumed during each cycle of operations, it is necessary that the tar should not be dispersed over the central cooler and less active part of the fuel bed nor likewise onto the side walls of the generator where it would tend to accumulate in patches and eventually interfere with the even distribution and descent of the fuel, but should be directed and confined to the active marginal portion of the fuel bed. To ensure this, the tar, which may be preheated, is projected preferably in isolated jets, onto the marginal portion under relatively low pressure through a nozzle or nozzles and to ensure the tar always striking the desired top portion of the fuel in cases where the level of the top of the fuel bed varies, the nozzle or nozzles are made adjustable, for instance in height.

Under these conditions it has been found that it is not necessary to heat the marginal zone by combustion with secondary air during the blow as has been proposed and which is undesirable.

To prevent tar dripping onto the central part of fuel bed where it would tend to remain unconsumed, simultaneously with the shutting off of the supply of tar, steam under controlled pressure is admitted to the supply pipe of the nozzle or nozzles so that the last particles of tar will be projected onto the marginal portion of the fuel bed top.

When the generator is charged with fuel at long intervals it is preferred not to spray tar into the generator during the first run after charging.

Instead of gas tar, tar products, heavy hydrocarbon oils or residuums may be utilized in the manufacture of gas as herein described, and the expression "tar" as used herein is intended to include such materials as well as tar.

I claim:

1. In the process of the manufacture of carburetted water gas, the following steps: upwardly air blasting an ignited fuel bed in a water gas generator in the absence of secondary air, thereby causing the marginal portion of the upper part of the fuel bed to assume a higher temperature than does the central portion of the upper part of the fuel bed; and spraying tar onto the hot marginal portion of the fuel bed only, and gasifying the tar by means of the heat stored in the fuel bed.

2. In the process of the manufacture of carburetted water gas, the following steps: upwardly air blasting an ignited fuel bed in a water gas generator in the absence of secondary air, thereby causing the marginal portion of the upper part of the fuel bed to assume a higher temperature than does the central portion of the upper part of the fuel bed; and making an uprun with steam through the ignited fuel bed and spraying tar onto hot marginal portion of the fuel bed only during the latter part of the uprun, and gasifying the tar by means of heat stored in the fuel bed.

3. In the process of the manufacture of carburetted water gas, the following steps: upwardly air blasting an ignited fuel bed in a water gas generator in the absence of secondary air, thereby causing the marginal portion of the upper part of the fuel bed to assume a higher temperature than does the central portion of the upper part of the fuel bed; and making a run with steam through the ignited fuel bed and spraying tar onto the hot marginal portion of the fuel bed, thereby gasifying the tar by means of the heat stored in the fuel bed.

ARTHUR ROBERT GRIGGS.